Figure 1:
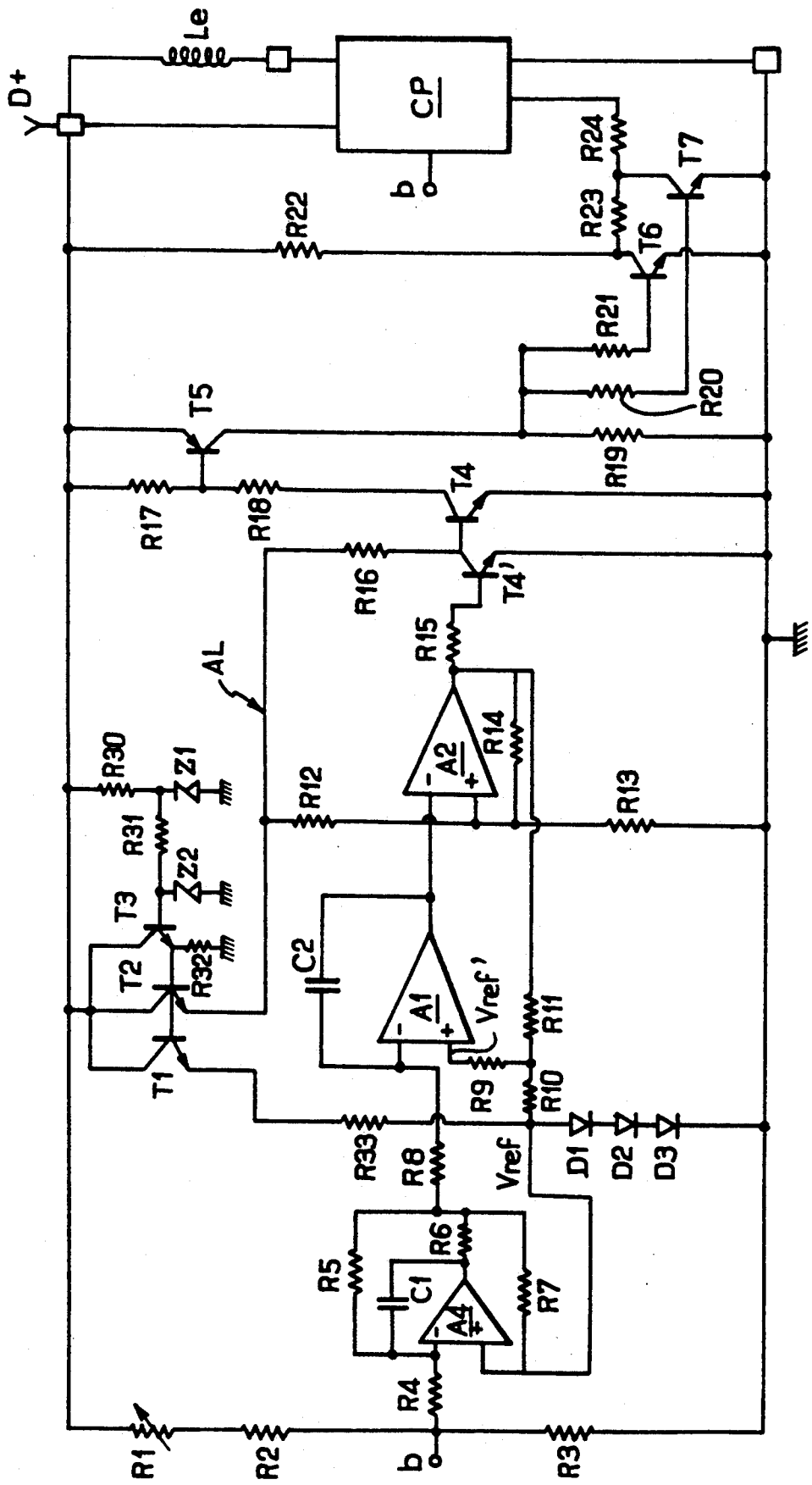

United States Patent [19]
Pierret et al.

[11] Patent Number: 5,285,146
[45] Date of Patent: Feb. 8, 1994

[54] REGULATOR CIRCUIT FOR THE VOLTAGE FOR CHARGING A BATTERY BY AN ALTERNATOR

[75] Inventors: Jean-Marie Pierret; Raymond Rechdan, both of Paris, France

[73] Assignee: Valeo Equipements Electriques Moteur, Creteil, France

[21] Appl. No.: 915,055

[22] Filed: Jul. 16, 1992

[30] Foreign Application Priority Data

Jul. 25, 1991 [FR] France ................................ 91 09445

[51] Int. Cl.$^5$ ................................................ H02J 7/14
[52] U.S. Cl. ............................................ 322/25; 322/28
[58] Field of Search ....................... 320/64; 322/25, 28

[56] References Cited

U.S. PATENT DOCUMENTS

| | | | |
|---|---|---|---|
| 4,590,414 | 5/1986 | Mayumi et al. | 320/64 |
| 4,629,967 | 12/1986 | Voss | 322/28 |
| 5,144,219 | 9/1992 | Conzelmann et al. | 322/25 |

FOREIGN PATENT DOCUMENTS

| | | |
|---|---|---|
| 0087583 | 9/1983 | European Pat. Off. |
| 0106539 | 4/1984 | European Pat. Off. |
| 2070297A | 9/1981 | United Kingdom |
| 1602977 | 11/1981 | United Kingdom |

*Primary Examiner*—R. J. Hickey

[57] ABSTRACT

A regulator circuit for the voltage for charging a battery by an alternator comprises in succession:

processing and comparison means (A4, A1, A2) receiving a fraction of an alternator voltage (D+) and generating a monotonic variation of the mean voltage regulated as a function of the load on the alternator,
  power switching means (CP, T101) in series with an excitation winding (Le).
Semiconductor correction means (CP) are associated directly and non-resistively with the power switching means and produce an offset of said voltage fraction which varies monotonically with the intensity of the current in the excitation winding and of the load on the alternator, in order to compensate said monotonic variation generated by the processing and comparison means and to obtain a mean value of the charging voltage which is essentially constant over all of the operating range.

9 Claims, 2 Drawing Sheets

FIG._1

REGULATOR CIRCUIT FOR THE VOLTAGE FOR CHARGING A BATTERY BY AN ALTERNATOR

The present invention relates, in a general way, to a regulator device for the voltage for charging a battery by an alternator.

In a conventional regulator, the output voltage from the alternator, for example the voltage D+ available at the common point of the diodes called "trio" diodes of a three-phase alternator is compared with a fixed threshold voltage. Upstream from the comparator circuit, the fundamental of the ripple component of the voltage D+ is eliminated by filtering and downstream from the comparison is provided a power circuit which opens and closes a supply circuit for the excitation winding of the alternator as a function of the result of the comparison.

Physically, a conventional regulator circuit may comprise an integrator-comparator circuit associated with a trigger, which has the purpose of avoiding the openings/closings of said supply circuit taking place at an excessively rapid rate. One drawback of such a circuit resides in that, when the flow of current or the load on the alternator rises, the mean value of the regulated voltage falls.

It is known, in order to alleviate this phenomenon, to bring about, at the point of the voltage applied to the integrator-comparator circuit, appropriate correction making it possible to obtain, in all operating regimes, a substantially constant mean regulated voltage value.

This correction can be brought about by sensing the current which flows in the excitation winding and by superimposing on the voltage to be regulated a DC voltage as a function of this information.

The conventional technique for doing this consists in providing a shunt resistor in series with the winding, and in using the voltage at the terminals of this shunt as information representative of the current in the alternator.

This solution, however, exhibits drawbacks. First of all, the presence of the shunt implies an energy dissipation by Joule effect which can prove to be troublesome. Next, the processing circuit connected to the terminals of the shunt, which must be equal to the task of processing a floating potential difference, is relatively expensive.

The present invention aims to alleviate these drawbacks. To this end, it proposes a regulator circuit for the voltage for charging a battery by an alternator, especially in a motor vehicle, which comprises:

processing and comparison means receiving a defined fraction of a voltage delivered by the alternator and themselves generating a monotonic variation of the mean voltage regulated as a function of the load on the alternator, power switching means in series with an excitation winding of the alternator and controlled by the output of the processing and comparison means, semiconductor correction means associated directly and non-resistively with the power switching means and capable of producing an offset of said voltage fraction applied to the filtering means, said offset varying monotonically with the intensity of the current in the excitation winding and of the load on the alternator, in such a way as to compensate said monotonic variation generated by the processing and comparison means and to obtain a mean value of the charging voltage which is essentially constant over all of the operating range of the alternator.

Figure 2:
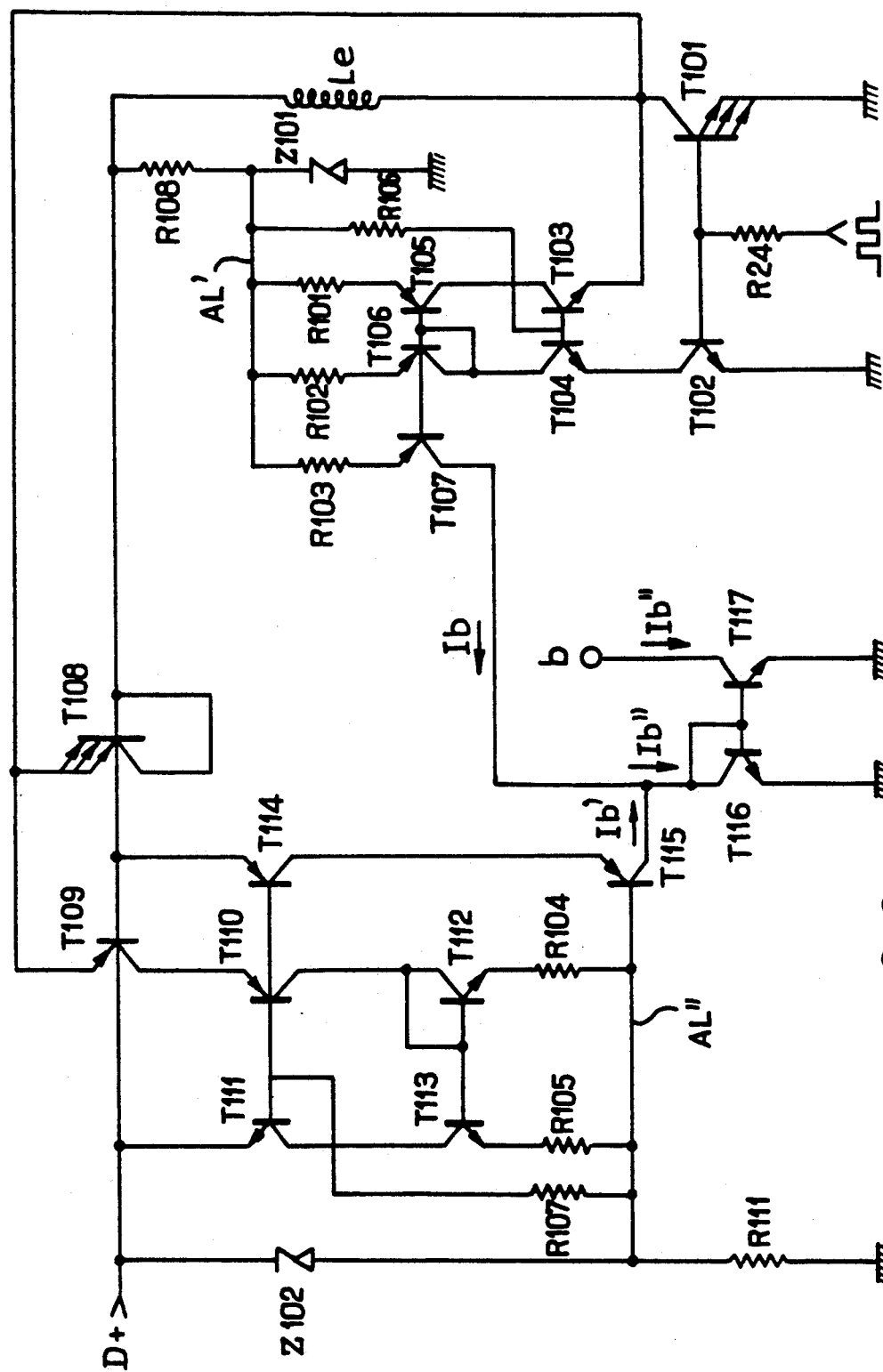

Other aspects, objects and advantages of the present invention will appear better on reading the following detailed description of a preferred embodiment of the latter, given by way of non-limiting example and with reference to the attached drawings, in which:

FIG. 1 is an electrical diagram of the assembly of a regulator circuit according to the present invention, and FIG. 2 is a detailed electrical diagram of a part of the circuit of FIG. 1.

With reference first of all to FIG. 1, the voltage D+ derived from the common point of the trio diodes (not shown) of a three-phase alternator is applied to an adjustable divider bridge comprising an adjustable resistor R1 and fixed resistors R2 and R3, in series. The common point between R2 and R3 (denoted "b") is applied to the inverting input of an operational amplifier A4 via a resistor R4. A capacitor C1 is mounted between the output of A4 and its inverting input. The output of A4 is further linked to a first terminal of a resistor R6. The second terminal of R6 is linked, on the one hand, to the inverting input of A4 via a resistor R5 and, on the other hand, to the non-inverting input of A4 via a resistor R7.

The signal present on the second terminal of R6 is applied to the inverting input of a second operational amplifier A1 via a resistor R8. The non-inverting input of A1 is linked via a resistor R9 to the first terminals of two resistors R10 and R11. The second terminal of R10 is linked to earth via three diodes D1, D2, D3 linked in series in the conducting direction, and to the non-inverting input of A4. A capacitor C2 is mounted between the output of A1 and its inverting input. The output of A1 is linked directly to the inverting input of a third operational amplifier A2. The non-inverting input of A2 is linked to the common point of a voltage divider bridge constituted by two resistors R12 and R13 in series between a stabilized DC supply line AL and earth. The output of A2 is linked to its non-inverting input via a resistor R14, and directly to the second terminal of R11.

The output of A2 drives, via a resistor R15, the base of a bipolar NPN transistor T4' whose emitter is at earth and whose collector is linked, via a resistor R16 to the abovementioned line AL. The collector of T4' drives the base of another NPN transistor T4, whose emitter is at earth. A series mounting of a resistor R17 and of a resistor R18 is provided between the voltage line D+ and the collector of T4. The common point between R17 and R18 is linked to the base of a PNP transistor T5 whose emitter is linked to the line D+ and whose collector is linked to earth via a resistor R19. This collector is also linked to the bases of two NPN transistors T6 and T7 respectively via two resistors R20 and R21. The emitters of T6 and T7 are at earth. The collector of T6 is linked to the line D+ via a resistor R22. A resistor R23 links the collectors of T6 and T7. A resistor R24 links the collector of T7 to one terminal of a power circuit CP for the control of the excitation current Ie flowing in an excitation winding Le of the alternator and comprising, as will be seen in detail later, means for deriving an information item representative of this current Ie. The winding Le is connected between the circuit CP and the line D+. The circuit CP is also linked directly to the line D+ and to earth.

A series mounting of a resistor R30 and of a zener diode Z1 is linked between the line D+ and earth. The common point between R30 and Z1 is linked to the base of an NPN transistor T3. A zener diode Z2 is mounted between the base of T3 and earth. The emitter of T3 is linked to earth via a resistor R32 and directly to the base of an NPN transistor T2. The collectors of T2 and of T3 are linked to the line D+, while the emitter of T2 is linked to the stabilized supply line AL.

The base of T2 is linked to the base of another NPN transistor T1 whose collector is linked to the collector of T3 and whose emitter is linked to the second terminal of R10 via a resistor R33.

The power circuit CP will now be described in detail with reference to FIG. 2.

The excitation winding Le is connected between the line D+ and the collector of a multi-emitter power transistor T101 of NPN type whose emitters are linked to earth. The control signals issued by the transistor T7 of FIG. 1 are applied to the base of T101 via the resistor R24. The collector of T101 is linked to a first terminal of Le, whose second terminal is linked to the line D+.

An NPN transistor T102 has its base linked to that of T101 and its emitter linked to earth. Preferably, in the case of an integrated embodiment, T102 is constituted by an individual cell of the multi-cell transistor T101.

The collector of T102 is linked to the emitter of an NPN transistor T104. The base of T104 is linked to the base of an identical transistor T103 whose emitter is linked to the collector of T101. The collector of T103 is linked to its base.

The collectors of T103 and T104 are linked respectively to the collectors of two transistors T105, T106 of PNP type, whose bases are linked together as well as to the collector of T106.

The emitters of T105 and T106 are linked to a stabilized DC supply line AL' respectively via two resistors R101 and R102. This line AL' is linked to the common point between a resistor R108 and a zener diode Z101 mounted in series between the line D+ and earth. The collectors of T103 and T105 are also linked to the line AL' via a resistor R106.

A PNP transistor T107 has its base linked to those of T105 and T106 and its emitter is linked to the line AL' via a resistor R103.

The multi-emitter transistor T108 of PNP type constitutes the freewheel diode of the winding Le. It is linked by its base and its collector to the line D+, and by its emitters to the first terminal of Le.

The transistor T109 is a PNP transistor whose emitter is linked to the emitters of T108 and whose base is linked to that of T108.

In the case of an integrated embodiment, T109 is preferably produced from an individual cell of the transistor T108 (in a similar way to the transistors T101 and T102).

The collector of T109 is linked to the emitter of another PNP transistor T110. The base of T110 is linked to the bases of two other PNP transistors T111 and T114 whose emitters are linked to the line D+. These bases are furthermore linked to the collector of T111.

The collectors of T110 and T111 are respectively linked to the collectors of two NPN transistors T112 and T113 whose bases are linked together as well as to the collector of T112.

The emitters of T112 and T113 are linked to a stabilized DC voltage line AL" via respective resistors R104 and R105. The collectors of T111 and T113 are also linked to the line AL" via a resistor R107.

The line AL" is linked to the common point between a zener diode Z102 and a resistor R111 mounted in series from the line D+ to earth.

The base of a PNP transistor T115 is linked to the line AL". Its emitter is linked to the collector of T114 and its collector to the collector of T107.

It is noted that the circuit of FIG. 2 comprises two distinct and similar parts respectively associated with the power components T101 and T108 (respectively the circuit constructed around T102 to T107 and the circuit constructed around T109–T115).

The collectors of T107 and T115 are linked to the collector of an NPN transistor T116, to the base of the latter as well as to the base of another NPN transistor T117. The emitters of T116 and T117 are linked to earth. The collector of T117 is linked to a terminal "b" corresponding to the terminal "b" of FIG. 1.

The operation of the circuit according to the present invention will now be described.

In FIG. 1, the circuit constructed around T1–T3 is intended to apply a stable DC voltage, for example of +5 volts, to the supply line AL, from the fluctuating voltage D+. It is from this stable voltage that the fixed threshold voltage applied to the non-inverting input of the comparator A2 is produced, with the aid of resistors R12 and R13. Furthermore, T1 supplies the diodes D1 to D3 in the conducting direction via R33, in order to fix, on the anode of D1, a well-defined reference voltage, denoted Vref, equal to the sum of the voltage losses of these three diodes.

Clearly, any other appropriate means may be used to produce this reference voltage Vref.

The operation amplifiers A1, A2 and A4 can be supplied from the common point between R30 and Z1.

At the input of the circuit constructed around A4 is applied the superimposition:
  of a fraction of the voltage D+, defined by the values of R1 to R3, and
  of a DC correction voltage applied to the terminal "b" and whose value is a function of the current in the excitation winding, as will be seen later.

The circuit constructed around A4 is an active low-pass filter of conventional type per se, intended to eliminate the high-frequency ripple component fundamental from the signal.

This filter supplies, at its output, a voltage which is representative of the main value of D+, corrected.

One advantage of the use of an active filter resides in that the capacitance of C1 can be much less than that of the capacitor of a passive filter, which permits C1 to take up a very much reduced semiconductor surface in the case of the integrated embodiment of the regulator circuit.

The circuit constructed around A1 and A2 combines a comparator-integrator and a trigger, with feedback via the resistor R11. It behaves in the manner of a Schmitt trigger, that is to say that the switchovers of A2 take place at two different input levels, respectively lower and higher, according to whether the signal is in descending or ascending phase. More precisely, the resistor R11 makes it possible to vary, according to the output state of A2, the reference voltage Vref applied to the non-inverting input of the integrator stage A1.

Such a circuit has the essential purpose of limiting the frequency at which the regulation is effected and also to avoid untimely switchings triggered by possible residual ripples in the signal applied to A1, which have not been suppressed by the action of the filter constructed around A4.

The feedback of the output of A2 onto A1 via R11 modifies the value of the reference voltage, denoted Vref, applied to the non-inverting input of A1, this voltage Vref, being derived from Vref via R9 and R10. Hence the mean value of Vref, rises at the same time as the duty cycle of the signal delivered by A2, which is itself essentially proportional to the excitation current. It is easy to demonstrate that this phenomenon leads to a diminution in the mean value of the regulated voltage as a function of the load on the regulator (it is observed in effect that the stages A1 and A2, due to the signal inversion provided by the stage A4, work on signals in which change is the inverse of that in the mean value of D+).

The stages constructed around T4', T4, T5, T6 and T7 make it possible to transcribe the switchover of the output of A2 to the site of the power transistor T101 included in the power circuit CP. T4' has the purpose of effecting the necessary logic inversion due to the fact that the components A1 and A2 work on signals in which change is the inverse of the change in the mean value of D+.

Moreover, the particular mounting of T6, T7, R22, R23 and R24 is observed. This mounting comes to be substituted for a conventional mounting in which T7 does not exist and is replaced by a simple resistor, and this novel mounting has the purpose of avoiding untimely triggering of the regulator circuit when the voltage D+ comprises high positive voltage peaks likely to trigger T101 while T6 is saturated.

The operation of the circuit of FIG. 2 will now be described.

When a current flows in the winding Le and in the transistor T101, a well-defined fraction of the current for example a thousandth of this current in the case where T101 comprises a basis of a thousand cells one of which is used for T102) flows in T102.

The transistors T103–T104 and T105–T106 are two pairs of transistors forming current mirrors, mounted between earth and the line AL', whose potential difference with respect to earth is fixed by the value of Z101 and is equal, for example, to +5 volts. These current mirrors have the purpose of recopying, to the level of T107, the current which flows in T102. In this way, T107 delivers via its collector a current Ib which is proportional to the direct excitation current (that is to say to the current which passes through Le during the periods when T101 is saturated).

In the same way, the transistor T109 is traversed by a well-defined fraction (for example a thousandth) of the current which passes through the freewheel diode defined by T108.

The pairs of transistors T110–T111 and T112–T113 constitute current mirrors mounted between the line D+ and the line AL", whose potential difference with respect to D+ is held constant by Z102 and is, for example, equal to 5 volts. These current mirrors make it possible to recopy into T114 and T115 the current which passes through T109. T115 delivers, via its collector, a current Ib which is proportional to the freewheel current flowing in Le and T108 during the periods when T101 is turned off.

The currents delivered by the collectors of T107 and T115 are joined together and pass through T116, which forms a current mirror with T117. T116 and T117 constitute a mixer circuit, and T117 therefore subtracts at point "b" a current Ib which is proportional to the current flowing in the inductor Le.

By virtue of this circuit, it is no longer necessary to measure current by taking voltage at the terminals of a shunt in series with Le, with the advantages that were mentioned in the introduction.

It was indicated above that the fraction of the voltage D+ applied at the input of the filter A4 was corrected as a function of the current flow or of the load on the alternator. This correction is provided by the above-mentioned current Ib, which superimposes, on the voltage D+, a DC component which is proportional to the value of Ib and caused by the flow of Ib in R1 and R2.

Hence, when the load on the alternator increases, the regulation is effected on an input voltage value which is offset increasingly downwards with respect to the mean value of D+. In consequence, via this specific part of the circuit, the value of the regulated voltage tends to rise progressively with the load on the alternator.

It will be understood that this correction of the mean regulated value makes it possible to compensate for the inverse effect obtained as described above by the circuits A1 and A2, and in the final analysis the circuit of the invention makes it possible to obtain a basically constant regulated value over all of the operating range of the alternator.

Needless to say, the present invention is in no way limited to the embodiment described above and represented in the drawings, but the person skilled in the art will know how to apply any variant or modification in accordance with his wishes.

In particular, the circuit for regulation over a mean value as described above can be complemented, if desired, by additional positive and/or negative peak detection circuits for the voltage D+, which are intended especially to avoid this voltage comprising an excessive ripple component bearing the risk of inducing excessive heating in the peak clipping diodes conventionally associated with the alternator.

We claim:

1. A regulator circuit for regulating the voltage delivered by an alternator for charging a battery, comprising;

divider means for generating a predetermined fraction of the voltage delivered by the alternator;

processing an comparing means receiving said predetermined voltage fraction and generating a control signal, power switching means comprising a first transistor in series with an excitation winding of the alternator and controlled by said control signal so as to regulate said voltage delivered by the alternator, said processing and comparing means being constructed so as to inherently cause the mean regulated voltage to vary monotonically as a function of the load of the alternator, semi-conductor correction means comprising a second transistor associated with said first transistor in such a way as to be traversed by a small current equal to a predetermined fraction of the current in said first transistor, current mirror means for recopying said small current, and offset generation means provided at said divider means for receiving said recopied small current and generating therefrom an offset of said predetermined voltage fraction, said offset varying monotonically with the intensity of the current in said first transistor and therefore with the load of the alternator, whereby said monotonic variation of the mean regulated voltage is compensated and the mean value of the charging voltage is essentially constant over the whole operating range of the alternator.

2. The circuit as claimed in claim 27, wherein said processing and comparing means comprise an active low-pass filter.

3. The circuit as claimed in claim 1, wherein said processing and comparing means comprise an integrator circuit to which a reference voltage is applied and a comparator circuit to which a fixed threshold voltage is applied, said reference voltage of the integrator circuit varying as a function of the output state of the comparator circuit.

4. The circuit as claimed in claim 1, further comprising a free-wheel diode associated to said excitation winding, said diode being constituted by a third transistor, and wherein said correction means comprise a fourth transistor associated with said third transistor in such a way as to be traversed by a second small current equal to a predetermined fraction of the current in said third transistor, and current mirror means for recopying said second small current and applying the latter to said offset generation means.

5. The circuit as claimed in claim 1, wherein said first and second transistors and said third and fourth transistors, respectively, are made on one same semiconductor chip and comprise a large number of cells, at least one of said cells constituting the second or fourth transistor, respectively.

6. The circuit as claimed in claim 30, wherein said first and second small currents are combined in said offset generation means into a global small current which is representative of the current traversing said excitation winding.

7. The circuit as claimed in claim 6, wherein said divider means comprises a resistive divider bridge, and wherein said offset of said voltage fraction is generated by extracting said global small current from a midpoint of said divider bridge.

8. The circuit as claimed in claim 1, wherein two transistors are provided between said processing and comparing means and said power switching means, said control signal output by said processing and comparing means controls the turning on and off of said two transistors, the collector of one transistor being connected to the voltage to be regulated via a first resistor, the collector of the other transistor being connected to the collector of said one transistor via a second resistor and to a control input of said power switching means through a third resistor.

9. The circuit as claimed in claim 1, wherein said inherent monotonic variation of said mean regulated voltage is a monotonic decrease, and said monotonic variation of said voltage fraction offset is monotonic decrease.

* * * * *